(12) United States Patent
Anzai (10) Patent No.: US 9,178,621 B2
(45) Date of Patent: Nov. 3, 2015

(54) METHOD TO IDENTIFY WAVELENGTH OF INCOMING LIGHT BY AVALANCHE PHOTODIODE, METHOD TO CONTROL OPTICAL TRANSCEIVER, AND OPTICAL TRANSCEIVER PERFORMING THE SAME

(71) Applicant: Sumitomo Electric Device Innovations, Inc., Yokohama (JP)

(72) Inventor: Shimako Anzai, Yokohama (JP)

(73) Assignee: Sumitomo Electric Device Innovations, Inc., Yokohama-shi (JP)

(*) Notice: Subject to any disclaimer, the term of this patent is extended or adjusted under 35 U.S.C. 154(b) by 0 days.

(21) Appl. No.: 14/276,755

(22) Filed: May 13, 2014

(65) Prior Publication Data

US 2014/0332686 A1    Nov. 13, 2014

(30) Foreign Application Priority Data

May 13, 2013    (JP) ................................ 2013-101537

(51) Int. Cl.
*G01J 5/20* (2006.01)
*H04B 10/40* (2013.01)
*G01J 9/00* (2006.01)

(52) U.S. Cl.
CPC .. *H04B 10/40* (2013.01); *G01J 9/00* (2013.01)

(58) Field of Classification Search
CPC ............. G01J 3/10; G01J 3/50; G01J 3/4412; G01J 3/457; G01J 9/00; H04B 10/691; H04B 10/07957; H04B 10/40
USPC ...................................................... 250/338, 4
See application file for complete search history.

(56) References Cited

U.S. PATENT DOCUMENTS

| | | | |
|---|---|---|---|
| 8,190,034 B2* | 5/2012 | Ichino et al. ................... | 398/202 |
| 2002/0145776 A1* | 10/2002 | Chow et al. .................... | 359/124 |
| 2003/0047752 A1* | 3/2003 | Campbell et al. ............. | 257/186 |
| 2003/0165207 A1* | 9/2003 | Noguchi et al. ............... | 375/371 |
| 2005/0100349 A1* | 5/2005 | Kuhara et al. ................. | 398/202 |
| 2005/0100350 A1* | 5/2005 | Nagakubo et al. ............. | 398/208 |
| 2009/0194675 A1* | 8/2009 | Ichino et al. .............. | 250/214 R |

FOREIGN PATENT DOCUMENTS

| | | |
|---|---|---|
| JP | 2003-069500 A | 3/2003 |
| JP | 2004-297592 A | 10/2004 |

\* cited by examiner

*Primary Examiner* — Mark Gaworecki
*Assistant Examiner* — Taeho Jo
(74) *Attorney, Agent, or Firm* — Venable LLP; Michael A. Sartori (57) ABSTRACT

A method to identify the wavelength of incoming light is disclosed. The method includes steps to measure a first photocurrent by setting the avalanche photodiode (APD) in a photodiode (PD) mode and a second photocurrent by setting the APD in the APD mode, and to compare a ratio of the two photocurrents with prepared references.

15 Claims, 6 Drawing Sheets

METHOD TO IDENTIFY WAVELENGTH OF INCOMING LIGHT BY AVALANCHE PHOTODIODE, METHOD TO CONTROL OPTICAL TRANSCEIVER, AND OPTICAL TRANSCEIVER PERFORMING THE SAME

BACKGROUND OF THE INVENTION

1. Field of the Invention

The present application relates to a method to identify a wavelength of incoming light to an optical transceiver, and an optical transceiver implementing with the function to identity the wavelength of the incoming light.

2. Background Arts

Optical receivers installed within the WDM system have various types and configurations. An optical receiver typically includes an optical receiving unit and a unit to define a wavelength of received optical signal. Such an optical receiver receives light generally multiplexing a plurality of optical signals each having a wavelength specific thereto but different from others. The optical receiving unit receives such multiplexed light and generates a plurality of electric signals each corresponding to the optical signals. The unit to define the wavelength monitors the wavelengths of the multiplexed optical signal.

One type of optical transceivers, which is often called as a pluggable optical transceiver, is used to be plugged into a port provided in the host system. Not only physical dimensions but electrical specifications to communicate with the host system and optical specifications to communicate with another optical transceiver are precisely defined in a standard for such pluggable optical transceivers. One standard requests that the optical transceiver can receive an optical signal with optical power of −24 dBm. In order to receive such a faint optical signal, an optical transceiver sometimes installs an avalanche photodiode (hereafter denoted as APD) as a light-receiving device because an APD inherently has a function to amplify photo-carriers converted from the faint optical signal. Namely, an APD may generate one or more electron-hole pairs for a single photon. The number of the electron-hole pairs is called as the multiplication factor M, and the parameter M strongly depends on a bias supplied to the APD.

SUMMARY OF THE APPLICATION

One aspect of the present application relates to a method to identify a wavelength of incoming light. The method includes steps of: (a) receiving the incoming light by the APD in the PD mode, where the APD shows the multiplication factor of substantially unity; (b) receiving the incoming light by the APD in the APD mode, where the APD shows the multiplication factor greater than the unity; and (c) identifying the wavelength by comparing the ratio of two photocurrents obtained in the PD mode and the APD mode, respectively, with pre-measured references.

Another aspect of the present application relates to an optical transceiver that provides an optical receiver, a post-amplifier, and a controller. The optical receiver includes an APD to receive incoming light that has a specific wavelength. The post-amplifier receives data and extracts a clock each contained in the incoming light. The controller measures a first photocurrent output from the APD by providing the first bias that sets the APD in one of the PD mode and the APD mode, a second photocurrent output from the APD by providing the second bias that sets the APD in another of the PD mode and the APD mode, and identifies the specific wavelength of the incoming light by comparing a ratio to two photocurrents with pre-measured references.

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENTS

Next, some preferred embodiments of the present application will be described as referring to drawings. In the description of the drawings, numerals or symbols same or similar to each other will refer to elements same or similar to each other without overlapping explanations.

Figure 6:
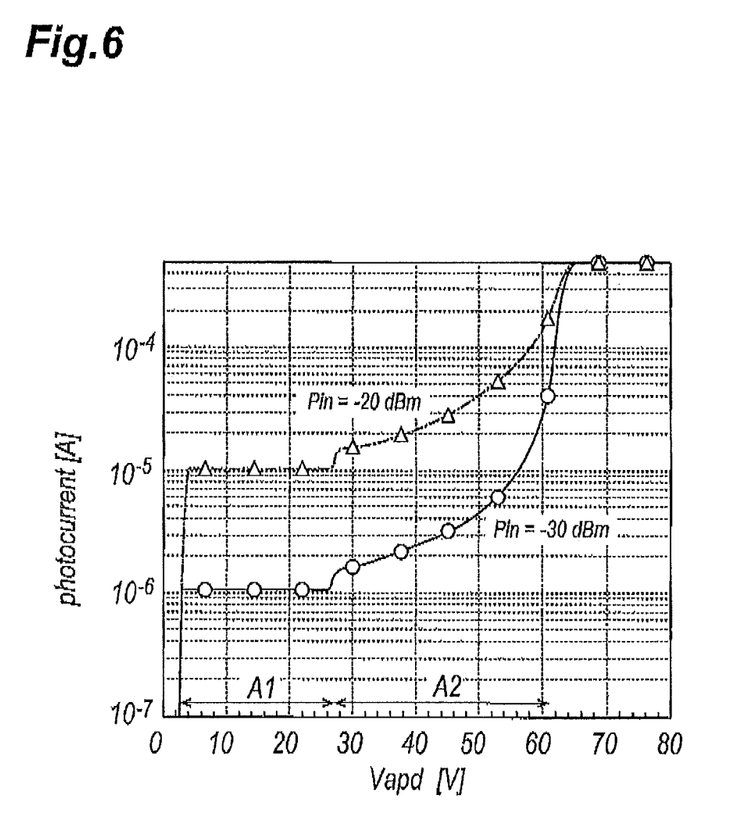
FIG. 6 shows responses of photocurrents of an APD against the bias voltage when input optical power Pin is −30 dBm and −20 dBm.

First, general characteristics of an APD will be described. FIG. 6 shows photocurrents (Ipd) output from an APD against a bias voltage applied thereto. As shown in FIG. 6, when the applied bias Vapd is relatively small in a region A1, the photocurrent Ipd is kept substantially constant against the applied bias but independent of the input optical power Pin. However, when the applied bias becomes large in another region A2, for instance, exceeding 28 V, the photocurrent drastically increases. The multiplication factor M is substantially kept in unity (=1) in the former applied bias smaller than 28 V, while, the multiplication factor M drastically increases in the latter bias region greater than 28 V.

In the explanations presented below, the former region, where the applied bias is smaller than 28 V and the multiplication factor M is unity, is called as that the APD is operated in the PD mode; while, in the latter region where the multiplication factor is greater than unity, the APD is operated in the APD mode. An APD is generally operable in a mode to show the multiplication factor greater than unity; accordingly, the bias supplied to the APD usually exceeds scores of volts.

Moreover, because the photocurrent output from an APD generally shows a wavelength dependence, the identification of the wavelength of light just received becomes inherently necessary when such an APD is used in the WDM system, in particular, in the CWDM (Coarse Wavelength Division Multiplexing) system. The CWDM system utilizes a wavelength range from 1300 nm to 1700 nm. Sequential procedures, that is, identifying the wavelength of the optical signal received by the APD, processing the photocurrent electrically which depends on the wavelength, and recovering data contained in the received optical signal, become necessary in an optical transceiver.

Figure 1:
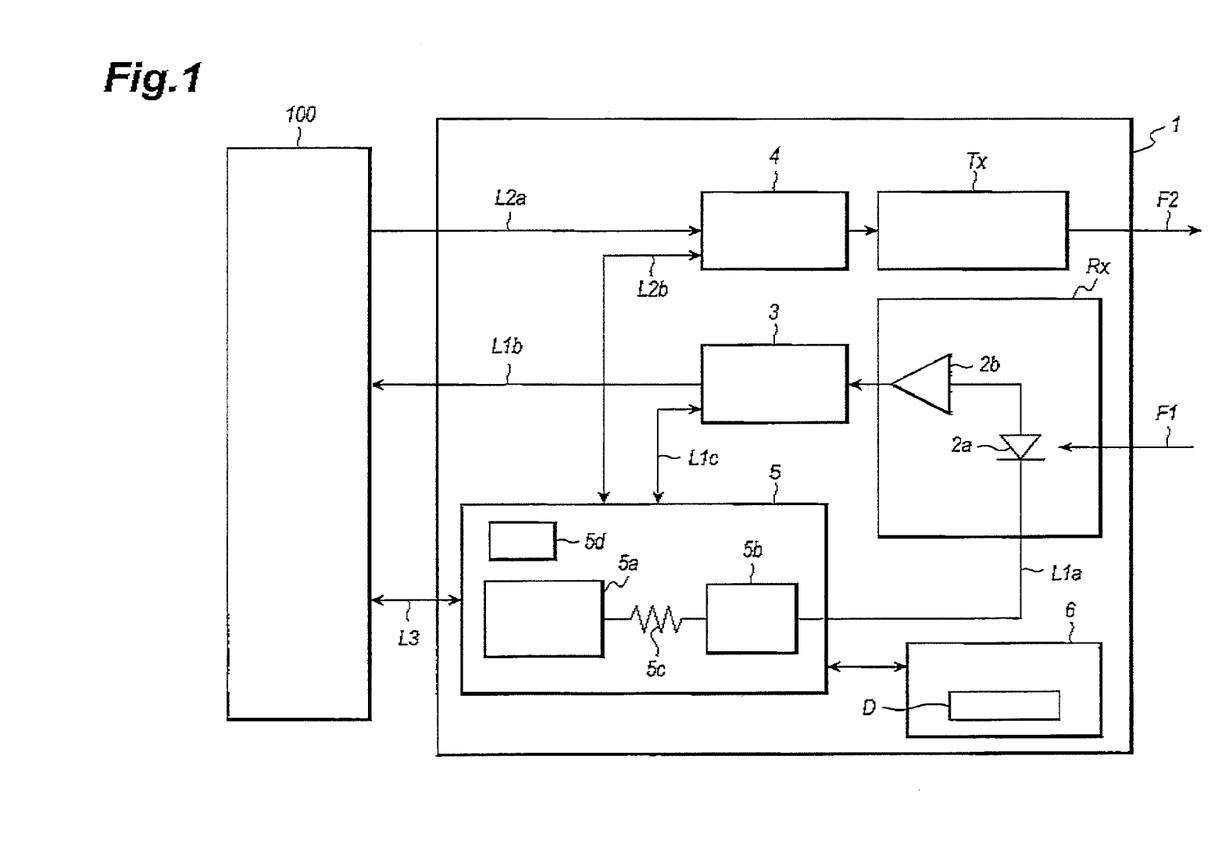
FIG. 1 is a functional block diagram of an optical a transceiver according to an embodiment of the present application.

FIG. 1 is a functional block diagram of an optical transceiver 1 that has a function to communicate with a host system 100 electrically. The optical transceiver 1 couples with duplex optical fibers to receive the incoming light F1 and transmit the outgoing light F2. The optical transceiver 1 includes an optical receiver Rx, an optical transmitter Tx, a post-amplifier 3, a driver 4, a controller 5, and a memory 6. The optical receiver Rx includes an APD 2a and a trans-impedance amplifier (TIA) 2b to convert a photocurrent generated in the APD 2a into an electrical signal. The controller 5 includes a bias generator 5a, a current detector 5b, a resistor 5c, and a memory 5d. Although the optical transceiver 1 shown in FIG. 1 provides the memory 6 outside of the controller 5, the controller 5 integrates the memory 6 with the inner memory 5d. In addition, the controller 5 includes the bias generator 5a, the resistor 5c, and the current detector 5b in the arrangement shown in FIG. 1; the controller 5 may push these units externally.

The optical receiver Rx, which receives the incoming light F1, is connected to the post-amplifier 3 and to the controller 5 through the command line L1a. Receiving the incoming light F1, the optical receiver Rx converts it into a voltage signal to be provided to the post amplifier 3.

The post-amplifier 3, which is provided with the voltage signal from the optical receiver Rx, recovers data and extracts a clock from the voltage signal. The post-amplifier 3 outputs the data and the clock to the host system 100 through a signal line L1b. Also, the post-amplifier 3, which is connected to the controller 5 through the command line L1c, provides an alarm named "Loss-Of-Signal" (hereafter denoted as LOS) to the controller 5 through the command line L1c. When the incoming light F1 lowers power thereof less than a preset threshold such that the post-amplifier 3 is impossible to recover data and extract a clock stably or securely, the post-amplifier 3 sets LOS to the controller 5.

The optical transmitter Tx outputs the outgoing light F2. The optical transmitter Tx, receiving a modulation signal from the driver 4, converts the modulation signal into the outgoing light F2 and outputs the light F2 to the optical fiber.

The driver 4, which is electrically connected to the host system 100 through the control line L2a and the controller 5 through the command line L2b, receives the modulation signal from the host system 100 through the signal line L2a and drives the optical transmitter Tx by providing the modulating signal to, for instance, a light-transmitting device such as semiconductor laser diode (hereafter denoted LD) installed in the optical transmitter Tx. The driver 4 receives a command TxDISABLE from the controller 5 through the command line L2b, which forcibly stops the LD from emitting the outgoing light F2.

The controller 5 executes a firmware stored in the memory 5d to control the optical transceiver 1 in normal operations Also, the controller 5 stores statuses in the optical transceiver 1 detected thereby in the memory 5d.

The controller 5 is connected with the host system 100 through the control line L3; while, the controller 5 is connected to the optical receiver Rx through the command line L1a to provide the bias for the APD generated in the bias generator 5a; receives the alarm LOS from the post-amplifier 3 through the command line L1c; and provides the command TxDISABLE to the driver 4 through the command line L2b. Also, the controller 5 stores status parameters in the optical transceiver 1 within the memory 6, and reads thus stored parameters from the memory 6.

The optical receiver Rx will be further described in detail. The optical receiver Rx includes the APD 2a and the TIA 2b. The APD 2a in the anode thereof is connected to the TIA 2b to transfer the photocurrent generated by the APD 2a. The TIA 2b converts the photocurrent into a voltage signal to provide to the post-amplifier 3. The APD 2a may be made of semiconductor material having an optical sensitivity for light with wavelengths from 1450 to 1650 nm, typically, the APD 2a includes a light-sensing layer (an active layer) primarily made of InGaAs.

The APD 2a in the cathode thereof is supplied with the bias voltage Vapd reaching several scores of volts, which is generated in the bias generator 5a, through the signal line L1a. Moreover, the controller 5 detects an average of the photocurrent by the current detector 5b.

Specifically, because of the fundamental theory of the current continuity, the photocurrent caused in the cathode of the APD 2a is equal to the photocurrent caused in the anode thereof. The cathode of the APD 2a provides a low-pass filter constituted by a capacitor and a resistor, then, the signal obtained in the cathode of the APD 2a corresponds to an average power of the incoming light F1. The current detector 5b may detect this average photocurrent as a voltage drop induced in the resistor 5c. That is, the output of the current detector 5b corresponds to the average power of the incoming light F1.

Figure 2:
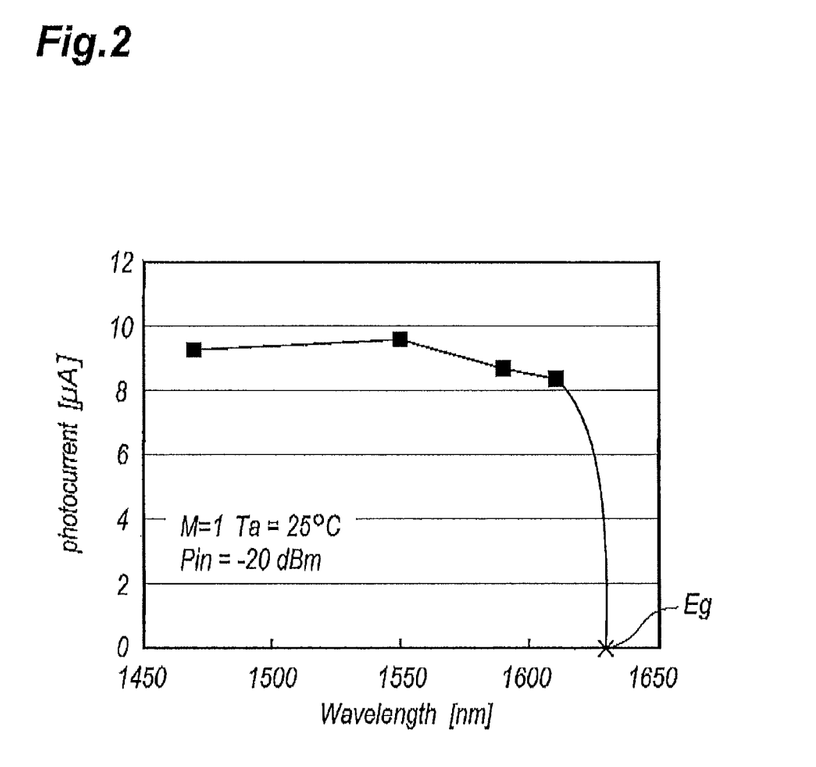
FIG. 2 shows a typical wavelength dependence of a photocurrent generated by an APD when the APD is operated in the PD mode.

Next, characteristics of the APD 2a will be described. An APD may generate a photocurrent reflecting incoming light, but the magnitude of the photocurrent depends on a wavelength magnitude of the optical signal, and a bias voltage. FIG. 2 shows a typical wavelength dependence of a photocurrent generated by an APD when the APD is operated in the PD mode, that is, the APD is supplied with a bias such that the APD shows the multiplication factor of the unity. The photocurrents shown in FIG. 2 are measured under a condition that an ambient temperature is 25° C. and the optical power is −20 dBm. The characteristics of the APD, in particular, the wavelength dependence thereof, inherently depends on materials constituting the APD. Almost all APDs are made of III-V compound semiconductor materials, in particular, in order to show a substantial sensitivity in infrared wavelengths, III-V compound semiconductor materials with the fundamental absorption edge in an infrared wavelength and the type of the direct gap semiconductor is often used. Such semiconductor materials are typically GaAs, InP, InAs and so on. These semiconductor materials show the absorption coefficient abruptly increasing from substantially 0 to $10^4$~$10^5$ /cm at the fundamental absorption edge in an infrared wavelength and gradually increasing in shorter wavelengths. Another semiconductor material InGaAs, which is widely used as a light-receiving device in wavelengths around 1.3 and 1.55 μm, has characteristics similar to those above described. In an example shown in FIG. 4, the APD in a light-sensitive layer thereof has the fundamental absorption edge Eg located at 1.63 μm, and substantially transparent in wavelengths longer than 1.63 μm.

Figure 4:
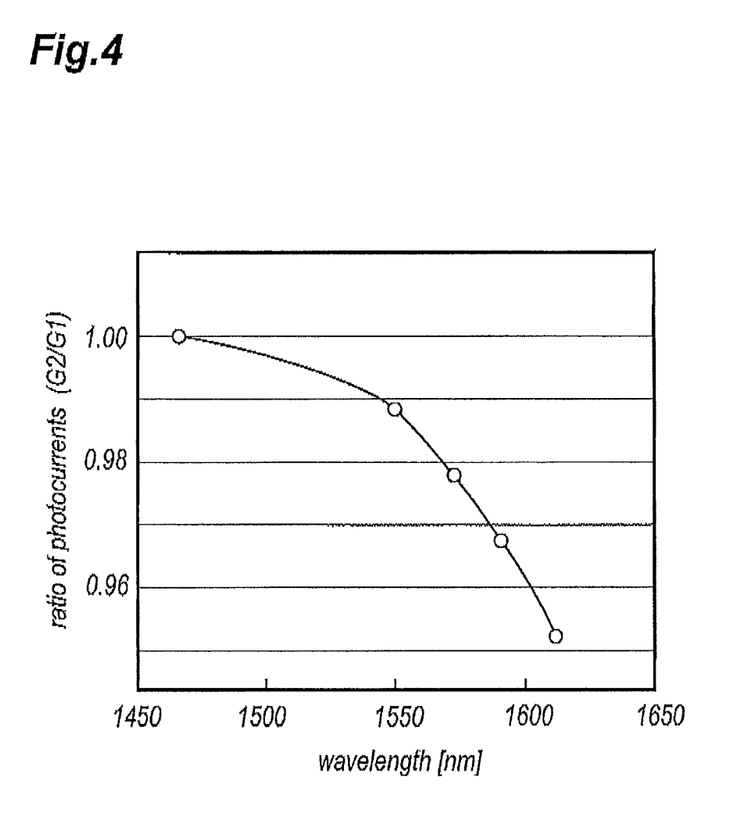
FIG. 4 shows the wavelength dependence of a response of an APD operated in the PD mode against that operated in the APD mode, where the response is normalized by the ratio at a wavelength of 1470 nm.

This means that the APD generates substantially no photocurrent for light with wavelengths longer than 1.63 μm. The present embodiment relates to wavelengths shorter than that corresponding to the fundamental absorption edge of the material constituting the APD, in particular, the material of the light-sensitive layer.

Figure 3:
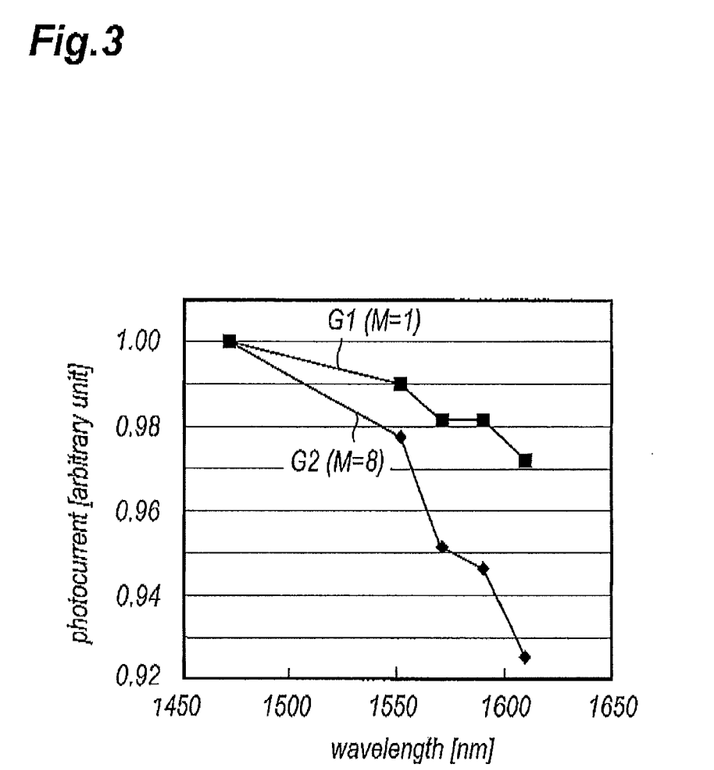
FIG. 3 compares the wavelength dependence of the photocurrent generated by an APD operated in the APD mode with that in the PD mode.

FIG. 3 shows characteristics of the photocurrent of the APD 2a in wavelengths shorter than that corresponding to the fundamental absorption edge as varying the bias supplied thereto, namely, as varying the multiplication factor M. The horizontal axis shows a wavelength, while, the vertical axis corresponds to the photocurrent by an arbitrary unit. In FIG. 3, the current detector 2b measured these cathode currents through the signal line L1a. The photocurrents are normalized at the wavelength of 1470 nm. Behavior G1 corresponds to the PD mode, namely the multiplication factor M of the unity; while, the other behavior G2 corresponds to the APD mode where the bias of 40 V was supplied to the APD 2a to set the multiplication factor M equal to 8. As shown in FIG. 3, the decrease of the photocurrents as increasing the wavelength in the APD mode shown by the behavior G2 exceeds that in the PD mode shown by the behavior G1.

FIG. 4 shows the wavelength dependence of a ratio of two behaviors, G1 and G2, shown in FIG. 3, normalized at the wavelength of 1470 nm. That is, the vertical axis denotes the ratio $K(\lambda)$ calculated by:

$$K(\lambda)=c(\lambda)/c(1470\ nm),$$

where $c(\lambda)$ is given by:

$$c(\lambda)=I^{M=8}(\lambda)/I^{M=1}(\lambda),$$

where $I^{M=8}(\lambda)$ is the photocurrent of the APD obtained in the APD mode with the multiplication factor of 8, while, $I^{M=1}(\lambda)$ is that obtained in the PD mode. A parameter $c(1470\ nm)$ is:

$$c(1470\ nm)=I^{M=8}(1470\ nm)/I^{M=1}(1470\ nm).$$

From relations above described, measuring the photocurrents at respective biases each setting the APD in the PD mode (M=1) and the APD mode (M=8), the optical transceiver may identify the wavelength of the incoming light F1 currently detected by the optical receiver Rx. Specifically, storing parameters D shown in FIG. 4 into the memory 6 at respective wavelengths, then detecting two photocurrents measured by the current detector 2b at respective modes, namely, M=1 and M=8, calculating the ratio c1 of thus measured two photocurrents, evaluating the ratio K1 (=c1/c(1470 nm)), and comparing thus calculated ratio K1 with parameters D stored in the memory 6, the optical transceiver may identify the wavelength of the incoming light 6 currently received by the optical receiver Rx.

The identification of the wavelength 2 of the incoming light F1 may be carried out at the initializing procedure of the optical transceiver 1. That is, the identification may be performed when the optical transceiver 1 first receives the incoming light F1.

Figure 5:
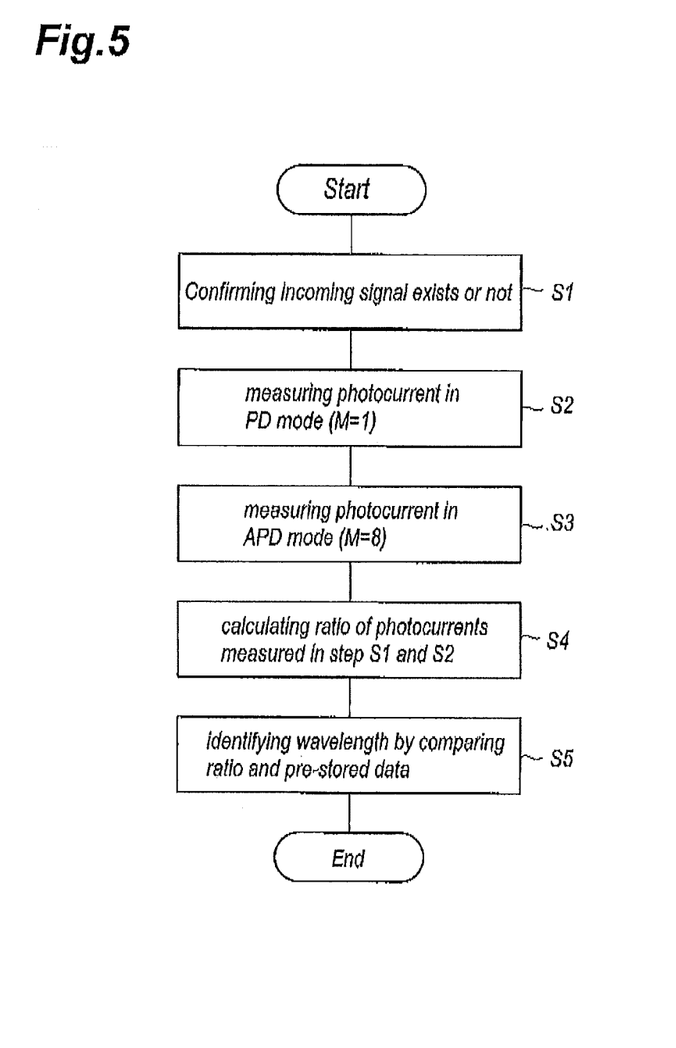
FIG. 5 shows a procedure to define a wavelength of received light carried out within the optical transceiver shown in FIG. 1.

FIG. 5 shows a flow chart of an algorithm to identify the wavelength of the incoming light. The optical transceiver 1 first confirms by the controller 5 at step S1 that the optical transceiver 1 practically receives the incoming light F1. Allocating an address for a flag in the memory 5d, the transceiver 1 sets this flag, which is called as the reset flag, during initializing procedures when the optical transceiver 1 is first set on the host system 100. The initializing procedures are often called as the power-on reset. When the optical transceiver 1 receives the incoming light F1 during the reset flag is set, the optical transceiver may decide that the incoming light F1 is first received and the process to identify the wavelength of the incoming light F1 is necessary to be carried out.

The controller 5 further confirms in step S1 that the incoming light F1 is not optical noises by referring to the alarm LOS through the signal line L1c. When the alarm LOS is set, the controller 5 decides which modes set the alarm LOS, namely, one is a case where the amplitude of the incoming light F1 itself is less than the preset threshold, and the other is a case where the post-amplifier 3 is impossible to recover the data and extract the clock in spite of the fact that substantial amplitude is detected by the optical receiver.

After completing step S1, two procedures of steps S2 and S3 are performed. The step S2 sets the bias supplied to the APD 2a such that the APD 2a operates in the PD mode, namely, the multiplication factor M=1. The bias Vapd set to the APD 2a in the PD mode is generally a power supply voltage supplied to front end circuits such as the TIA 2b in the optical receiver Rx, which is typically 3.3 volts. The controller 5 obtains the photocurrent I(M=1) as irradiating the APD 2a by the incoming light F1.

The step S3 sets the bias to a value at which the APD 2a is operated in the APD mode to show the multiplication factor M to be equal to, for instance, 8. Such a bias voltage in the APD mode sometimes reaches a score of volts, for instance, 40 volts. Then the controller 5 may get another photocurrent I(M=8) as the APD 2a receives the incoming light F1.

An optical transceiver, or a bias generator 5a may generally vary the bias Vapd supplied to the APD 2a depending on, for instance, an ambient temperature of the APD 2a, the magnitude of the incoming light F1, and so on. Specifically, the bias Vapd is adjusted such that, when the APD 2a receives incoming light with amplitude in a preset range, the APD 2a generates a photocurrent with magnitude in a preset range by feeding the photocurrent back to the bias generator.

On the other hand, the present arrangement fixes the bias Vapd in a preset and constant value, for instance 40 V, in the initializing procedures. Fixing the bias Vapd, the photocurrent output from the APD 2a simply depends on the amplitude of the incoming light F1. Then, evaluating the ratio of the photocurrents in respective modes, $I^{M=8}$ and $I^{M=1}$, the dependence of the photocurrent ratio on the wavelength may be evaluated.

The two modes, the APD mode and the PD mode, are sequentially switched; then, the magnitude of the incoming light F1 possibly fluctuates. The controller 5, when the fluctuation of the magnitude of the incoming light F1 between the two modes is detected, may compensate the fluctuation. For instance, switching between two modes as $PD_1 \rightarrow APD_1 \rightarrow PD_2 \rightarrow APD_2 \rightarrow \ldots PD_i \rightarrow APD_i \rightarrow \ldots$ by varying the bias Vapd and evaluating ratios of two photocurrents sequentially as follows:

$$I^{M=8}{}_n/I^{M=1}{}_{n-1},$$

$$I^{M=8}{}_n/I^{M=1}{}_n,$$

$$I^{M=8}{}_{n+1}/I^{M=1}{}_n,$$

$$I^{M=8}{}_{n+1}/I^{M=1}{}_{n+1},$$

where $I^{M=8}{}_i$ and $I^{M=1}{}_i$ mean the photocurrents in the APD mode and the PD mode detected at $i_{th}$ measurement, respectively. The controller 5 may determine the ratio when ratios obtained by the above procedures converge. That is, the controller 5 iterates steps S2 to S5 until the calculated ratio of two photocurrents converges.

The controller 5 compares the ratio evaluated by the above procedures with data D pre-stored in the memory 6 to identify the wavelength λ of the incoming light F1, and informs thus identified wavelength λ to the host system through the signal line L3. Then, the optical transceiver 1 practically operates to receive and transmit optical signals.

According to an optical transceiver thus described, the wavelength of the incoming light F1 may be identified during the initializing procedures performed by the controller 5 without preparing additional optical and electrical components. In an alternative, the controller 5 may carry out the wavelength identification procedures when the optical transceiver 1 first receives the incoming light F1 after the power-on reset initializing. The identified wavelength is provided to the host system 100, the host system 100 may allocate other wavelengths, grids, or channels, to other optical transceivers, which may facilitate the effective operation of the optical communication system.

The procedures to identify the wavelength X, may be carried out not only during the power-on reset but at a time when the optical transceiver 1 first receives light after resetting the status LOS. The status LOS is set when an optical connector is once released from the optical transceiver 1 even when the optical transceiver 1 is set on the host system 100. A combination of a transmitter optical transceiver and a receiver optical transceiver is probably revised, which means that the wavelength of the incoming light shifts to a new wavelength from a last one. In such a case, the controller 5 sets the status LOS because of the disappearance of the incoming light FL Then, after establishing the incoming light, the controller 5 negates the status LOS and begins the wavelength identification process because the wavelength of the incoming light is possibly shifted from the former one. Thus, not only during the power-on reset but being triggered by the reset of the status LOS, the sequential procedures to identify the wavelength of the incoming light is preferably carried out. Because the optical transceiver 1 may identify the wavelength of the incoming light F1 without preparing additional devices, the wavelength identification procedures may be flexibly carried out even after the status LOS is reset.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims.

What is claimed is:

1. A method to identify a wavelength of incoming light, comprising steps of:
   receiving the incoming light by an avalanche photodiode (APD) so as to generate a first photocurrent in a photodiode (PD) mode where the APD shows a multiplication factor of unity;
   receiving the incoming light by the APD so as to generate a second photocurrent in an APD mode where the APD shows a multiplication factor greater than the unity;
   calculating a ratio of the second photocurrent against the first photocurrent; and
   comparing the ratio with a pre-measured value to identify the wavelength of the incoming light.

2. The method of claim 1,
   wherein the APD is biased equal to or less than 28 V when the APD is operated in the PD mode, and greater than 28 V when the APD is operated in the APD mode.

3. The method of claim 1,
   wherein the multiplication factor of the APD is greater than 8 in the APD mode.

4. The method of claim 1,
   wherein steps from receiving the incoming light to comparing the ratio are iterated until the ratio converges.

5. A method to control an optical transceiver that provides an avalanche photodiode (APD) as a light-receiving device, comprising steps of:
   measuring a first photocurrent corresponding to incoming light by supplying a first bias to the APD such that the APD is set in one of a photodiode (PD) mode and an APD mode;
   measuring a second photocurrent corresponding to the incoming light by supplying a second bias to the APD such that the APD is set in another of the PD mode and the APD mode;
   calculating a ratio of one of the first and second photocurrents measured in the APD mode against another of the first and second photocurrents measured in the PD mode; and
   identifying a wavelength of the incoming light by comparing the ratio with prepared values.

6. The method of claim 5,
   wherein the optical transceiver further providing a post-amplifier that recovers data and a clock contained in the incoming light, the post-amplifier outputting an alarm when the incoming light in magnitude thereof becomes less than a preset threshold or the post-amplifier becomes unable to recover data and the clock regularly,
   wherein the method further includes steps of,
   before the step of measuring the first photocurrent, detecting a reset of the alarm output by the post-amplifier, and
   after identifying the wavelength of the incoming light, beginning a normal operation of the optical transceiver.

7. The method of claim 5,
   further including steps of, before measuring the first photocurrent,
   empowering the optical transceiver by supplying a power supply thereto, and
   detecting that the incoming light has substantial magnitude.

8. The method of claim 7,
   wherein the steps from detecting the incoming light to identifying the wavelength of the incoming light is carried out during an initialization of the optical transceiver.

9. The method of claim 5,
   wherein the optical transceiver has a function to communicate with a host system, and
   the method further including a step, after identifying the wavelength, informing the wavelength of the incoming light to the host system from the optical transceiver.

10. The method of claim 5,
    wherein the steps from measuring the first photocurrent to calculating the ratio are iterated until the calculated ratio converges.

11. An optical transceiver, comprising:
    an optical receiver that provides an avalanche photodiode (APD) to receive incoming light having a specific wavelength;
    a post-amplifier that recovers data and extracts a clock contained in the incoming light by receiving an output of the optical receiver; and
    a controller configured to identify the specific wavelength of the incoming light,
    wherein the controller measures a first photocurrent output from the APD by providing a first bias to set the APD operable in one of a photodiode (PD) mode and an APD mode, a second photocurrent output from the APD by providing a second bias to set the APD operable in another of the PD mode and the APD mode, and identifies the specific wavelength of the incoming light by comparing a ratio of one of the first and second photocurrents measured in the APD mode against another of the first and second photocurrents measured in the PD mode with pre-measured references.

12. The optical transceiver of claim 11,
    wherein the controller informs the specific wavelength to a host system where the optical transceiver is installed.

13. The optical transceiver of claim 11,
wherein the APD includes a light-sensing layer made of InGaAs and the specific wavelength of the incoming light is from 1450 to 1650 nm.

14. The optical transceiver of claim 11,
wherein the post-amplifier provides an alarm to the controller when the post-amplifier is unable to recover the data and extract the clock, or the APD receives incoming light with magnitude less than a preset threshold, and
wherein the controller identifies the specific wavelength of the incoming light after a reset of the alarm but before a start of a normal operation of the optical transceiver.

15. The optical transceiver of claim 11,
wherein the controller identifies the specific wavelength of the incoming light during an initialization of the optical transceiver after the optical transceiver is powered on but before the optical transceiver starts a normal operation.

\* \* \* \* \*